(12) United States Patent
Shim

(10) Patent No.: US 12,531,562 B2
(45) Date of Patent: Jan. 20, 2026

(54) ELECTRONIC DEVICES INCLUDING LOCK DETECTING CIRCUIT

(71) Applicant: SK hynix Inc., Icheon (KR)

(72) Inventor: Jae Min Shim, Icheon (KR)

(73) Assignee: SK hynix Inc., Icheon (KR)

( * ) Notice: Subject to any disclaimer, the term of this patent is extended or adjusted under 35 U.S.C. 154(b) by 58 days.

(21) Appl. No.: 18/437,546

(22) Filed: Feb. 9, 2024

(65) Prior Publication Data

US 2025/0088195 A1   Mar. 13, 2025

(30) Foreign Application Priority Data

Sep. 12, 2023   (KR) .................. 10-2023-0120853

(51) Int. Cl.
  *H03L 7/095*   (2006.01)
  *G11C 11/4076*   (2006.01)
  *H03K 3/037*   (2006.01)

(52) U.S. Cl.
  CPC .......... *H03L 7/095* (2013.01); *G11C 11/4076* (2013.01); *H03K 3/037* (2013.01)

(58) Field of Classification Search
  CPC .................. H03L 7/095; G11C 11/4076
  See application file for complete search history.

(56) References Cited

U.S. PATENT DOCUMENTS

| 2005/0073343 A1* | 4/2005 | Kim | H03L 7/095 327/156 |
| 2014/0085016 A1* | 3/2014 | Lee | H03L 7/095 327/48 |
| 2020/0272220 A1* | 8/2020 | Mosalikanti | G06F 1/3296 |
| 2020/0321966 A1* | 10/2020 | Masuda | H03K 19/20 |

FOREIGN PATENT DOCUMENTS

| KR | 10-2014-0040328 A | 4/2014 |
| KR | 10-2018-0036964 A | 4/2018 |

* cited by examiner

*Primary Examiner* — Patrick O Neill

(57) ABSTRACT

A lock detecting circuit includes a pre-clock detection signal generating circuit configured to detect phases of a first clock and a second clock to generate a first pre-clock detection signal and a second pre-clock detection signal based on the detected phases, a first clock detection signal generating circuit configured to generate a first clock detection signal by adjusting a pulse width of the first pre-clock detection signal, a second clock detection signal generating circuit configured to generate a second clock detection signal by adjusting a pulse width of the second pre-clock detection signal, and a lock control circuit configured to detect a phase difference between the first clock and the second clock, based on the first clock detection signal and the second clock detection signal to generate a lock signal.

18 Claims, 22 Drawing Sheets

FIG. 17

| JCD<1> | JCD<2> | DIV_S |
|--------|--------|---------|
| L | L | DIV1024 |
| H | L | DIV512 |
| L | H | DIV4096 |
| H | H | DIV2048 |

ELECTRONIC DEVICES INCLUDING LOCK DETECTING CIRCUIT

CROSS-REFERENCE TO RELATED APPLICATIONS

The present application claims priority under 35 U.S.C. 119(a) to Korean Patent Application No. 10-2023-0120853, filed on Sep. 12, 2023, which is incorporated herein by reference in its entirety.

BACKGROUND

1. Technical Field

Embodiments of the present disclosure relate to electronic devices including a lock detecting circuit associated with a feedback device for detecting a lock of an internal clock.

2. Related Art

Generally, synchronous memory devices such as a DRAM device are equipped with a feedback device such as a phase locked loop (PLL) or a delay locked loop (DLL). The feedback device may generate an internal clock that is locked in synchronization with an external clock received from an external device, and transmit the internal clock to an input/output circuit by which data input/output operations are performed.

The feedback device is equipped with a lock detecting circuit that compares the phases of an input clock and a feedback clock and generates a lock signal indicating a locked state when a phase difference between the input clock and the feedback clock is equal to or less than a preset value.

SUMMARY

The present disclosure may provide a lock detecting circuit including a pre-clock detection signal generating circuit configured to detect phases of a first clock and a second clock and generate a first pre-clock detection signal and a second pre-clock detection signal based on the detected phases, a first clock detection signal generating circuit configured to generate a first clock detection signal by adjusting a pulse width of the first pre-clock detection signal, a second clock detection signal generating circuit configured to generate a second clock detection signal by adjusting a pulse width of the second pre-clock detection signal, and a lock control circuit configured to detect a phase difference between the first clock and the second clock, based on the first clock detection signal and the second clock detection signal to generate a lock signal.

In addition, the present disclosure may provide a lock detecting circuit including a division control circuit configured to generate a latch clock detecting signal that is activated to initiate a lock detection period when a phase difference between a first clock and a second clock is equal to or less than a set phase difference, and to activate a selection signal to toggle division clocks when the lock detection period is initiated, and a lock control circuit configured to generate a judgement clock that is activated based on a division clock selected from the division clocks according to a judgement code and to generate a lock signal that is activated when the judgement clock is activated, after the lock detection period is initiated.

In addition, the present disclosure may provide an electronic device including a lock detecting circuit configured to generate a first pre-clock detection signal and a second pre-clock detection signal by detecting phases of a first clock and a second clock, adjust pulse widths of the first pre-clock detection signal and the second pre-clock detection signal to generate a first clock detection signal and a second clock detection signal, and to detect a phase difference between the first clock and the second clock, based on the first clock detection signal and the second clock detection signal to generate a lock signal.

BRIEF DESCRIPTION OF THE DRAWINGS

FIGS. 15 to 22 illustrate a lock signal generation operation of the lock detecting circuit shown in FIG. 1.

DETAILED DESCRIPTION OF THE EMBODIMENTS

In the following description of embodiments, when a parameter is referred to as being "preset," it may be intended to mean that a value of the parameter is determined in advance when the parameter is used in a process or an algorithm. The value of the parameter may be set when the process or the algorithm starts or may be set during a period that the process or the algorithm is executed.

It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal having a logic "high" level may be distinguished from a signal having a logic "low" level. For example, when a signal having a first voltage correspond to a signal having a logic "high" level, a signal having a second voltage correspond to a signal having a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal having a logic "high" level in one embodiment may be set to have a logic "low" level in another embodiment.

The term "logic bit set" may mean a combination of logic levels of bits included in a signal. When the logic level of each of the bits included in the signal is changed, the logic bit set of the signal may be set differently. For example, when the signal includes 2 bits, when the logic level of each of the 2 bits included in the signal is "logic low level, logic low level", the logic bit set of the signal may be set as the first logic bit set, and when the logic level of each of the two bits included in the signal is "a logic low level and a logic high level", the logic bit set of the signal may be set as the second logic bit set.

Various embodiments of the present disclosure will be described hereinafter in more detail with reference to the accompanying drawings. However, the embodiments described herein are for illustrative purposes only and are not intended to limit the scope of the present disclosure.

Figure 1:
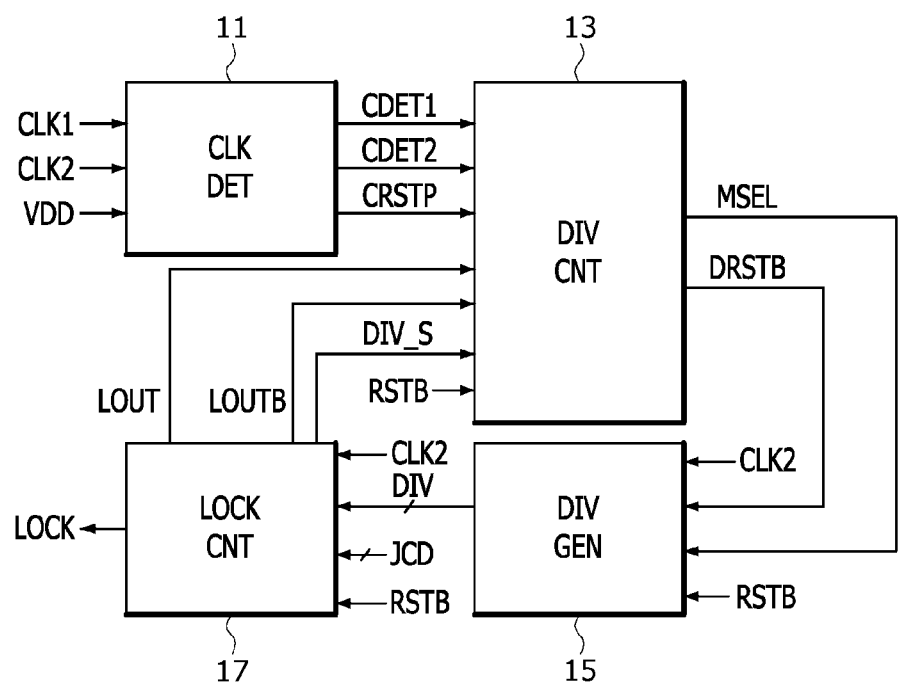
FIG. 1 illustrates a lock detecting circuit according to an embodiment of the present disclosure.

FIG. 1 illustrates a lock detecting circuit 1 according to an embodiment of the present disclosure. The lock detecting circuit 1 may include a clock detecting circuit (CLK DET) 11, a division control circuit (DIV CNT) 13, a division clock generating circuit (DIV GEN) 15, and a lock control circuit (LOCK CNT) 17.

The clock detecting circuit 11 may generate a first clock detection signal CDET1, a second clock detection signal CDET2, and a clock reset pulse CRSTP, based on a first clock CLK1, a second clock CLK2, and a power voltage VDD. Each of the first clock CLK1 and the second clock CLK2 may be set as an input clock and a feedback clock that are used in a feedback device (not shown) such as a phase locked loop (PLL), but this is only an example and embodiments are not limited thereto.

The clock detecting circuit 11 may generate the first clock detection signal CDET1 from the power voltage VDD, based on the first clock CLK1. The clock detecting circuit 11 may latch the power voltage VDD in synchronization with a preset edge of the first clock CLK1, and output the latched power voltage VDD as a first pre-clock detection signal (e.g., CDET_PRE1 in FIG. 2). The clock detecting circuit 11 may detect the preset edge of the first clock CLK1 to generate the activated first pre-clock detection signal (e.g., CDET_PRE1 in FIG. 2). In this embodiment, the preset edge of the first clock CLK1 may be set to a rising edge transitioning from a logic "low" level to a logic "high" level, but this is only an example and embodiments are not limited thereto.

The clock detecting circuit 11 may selectively adjust a pulse width of the first pre-clock detection signal (e.g., CDET_PRE1 in FIG. 2) to generate the first clock detection signal CDET1. When the pulse width of the first pre-clock detection signal (e.g., CDET_PRE1 in FIG. 2) is equal to or less than a set pulse width that is preset, the clock detecting circuit 11 may output the first pre-clock detection signal (e.g., CDET_PRE1 in FIG. 2) as the first clock detection signal CDET1 without adjusting the pulse width of the first pre-clock detection signal. On the other hand, when the pulse width of the first pre-clock detection signal (e.g., CDET_PRE1 in FIG. 2) is greater than the set pulse width, the clock detecting circuit 11 may adjust the pulse width of the first pre-clock detection signal (e.g., CDET_PRE1 in FIG. 2) to match the set pulse width and output, as the first clock detection signal CDET1, the first pre-clock detection signal (e.g., CDET_PRE1 in FIG. 2) with the adjusted pulse width. Therefore, a pulse width of the first clock detection signal CDET1 may not exceed the set pulse width.

Figure 2:
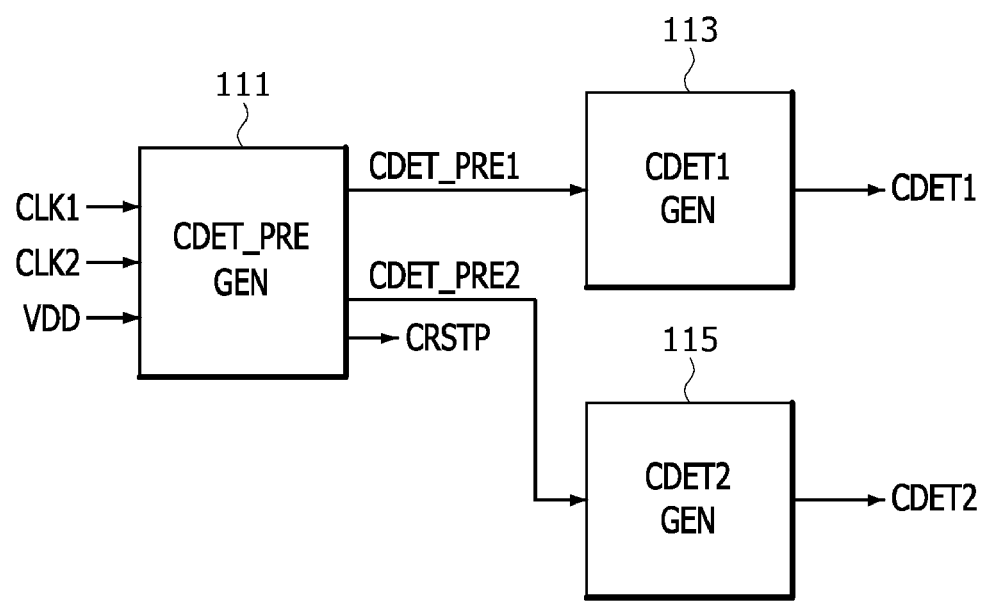
FIG. 2 illustrates a clock detecting circuit included in the lock detecting circuit shown in FIG. 1.

The clock detecting circuit 11 may latch the power voltage VDD in synchronization with a preset edge of the second clock CLK2, and output the latched power voltage VDD as a second pre-clock detection signal (e.g., CDET_PRE2 in FIG. 2). The clock detecting circuit 11 may detect the preset edge of the second clock CLK2 to generate the activated second pre-clock detection signal (e.g., CDET_PRE2 in FIG. 2). In this embodiment, the preset edge of the second clock CLK2 may be set to a rising edge, but this is only an example and embodiments are not limited thereto.

The clock detecting circuit 11 may selectively adjust a pulse width of the second pre-clock detection signal (e.g., CDET_PRE2 in FIG. 2) to generate the second clock detection signal CDET2. When the pulse width of the second pre-clock detection signal (e.g., CDET_PRE2 in FIG. 2) is equal to or less than a set pulse width, the clock detecting circuit 11 may output the second pre-clock detection signal (e.g., CDET_PRE2 in FIG. 2) as the second clock detection signal CDET2 without adjusting the pulse width of the second pre-clock detection signal. On the other hand, when the pulse width of the second pre-clock detection signal (e.g., CDET_PRE2 in FIG. 2) is greater than the set pulse width, the clock detecting circuit 11 may adjust the pulse width of the second pre-clock detection signal (e.g., CDET_PRE2 in FIG. 2) to match the set pulse width and output, as the second clock detection signal CDET2, the second pre-clock detection signal (e.g., CDET_PRE2 in FIG. 2) with the adjusted pulse width. Therefore, a pulse width of the second clock detection signal CDET2 may not exceed the set pulse width.

The clock detecting circuit 11 may generate the clock reset pulse CRSTP, based on the first pre-clock detection signal (e.g., CDET_PRE1 in FIG. 2) and the second pre-clock detection signal (e.g., CDET_PRE2 in FIG. 2). The clock detecting circuit 11 may generate the clock reset pulse CRSTP at a time point when both the preset edge of the first clock CLK1 and the preset edge of the second clock CLK2 are detected and then a preset reset delay period has elapsed. That is, the clock detecting circuit 11 may generate the activated clock reset pulse CRSTP once both the first pre-clock detection signal (e.g., CDET_PRE1 in FIG. 2) and the second pre-clock detection signal (e.g., CDET_PRE2 in FIG. 2) are activated, and after the reset delay period has elapsed.

The division control circuit 13 may be connected to the clock detecting circuit 11 and the lock control circuit 17. The division control circuit 13 may receive the first clock detection signal CDET1, the second clock detection signal CDET2, and the clock reset pulse CRSTP from the clock detecting circuit 11, and receive a latch output signal LOUT, an inverted latch output signal LOUTB, and a judgement clock DIV_S from the lock control circuit 17.

The division control circuit 13 may generate a selection signal MSEL and a division reset signal DRSTB, based on the first clock detection signal CDET1, the second clock detection signal CDET2, the clock reset pulse CRSTP, the latch output signal LOUT, the inverted latch output signal LOUTB, the judgement clock DIV_S, and a reset signal RSTB.

The division control circuit 13 may generate the division reset signal DRSTB that is activated to initialize a division clock DIV in an initialization operation. The initialization operation may be performed to initialize the lock detecting circuit 1 when the reset signal RSTB is activated.

The division control circuit 13 may generate a latch clock detection signal (e.g., LCDET in FIG. 6) that is activated to initiate a lock detection period when the clock reset pulse CRSTP is activated while both the first clock detection signal CDET1 and the second clock detection signal CDET2 are activated. The case in which the clock reset pulse CRSTP is activated while both the first clock detection signal CDET1 and the second clock detection signal CDET2 are activated may mean that the phase difference between the first clock CLK1 and the second clock CLK2 is equal to or less than a set phase difference.

The division control circuit 13 may generate the selection signal MSEL that is activated to toggle the division clock DIV, based on the inverted latch output signal LOUTB, when the latch clock detection signal (e.g., LCDET in FIG. 6) is activated and the lock detection period is initiated. Here, 'toggling of the division clock DIV' may mean that at least one of division clocks (e.g., DIV1~DIV4096 in FIG. 7) included in the division clock DIV transitions in logic level according to counting.

For example, the division clock DIV1024 may be implemented to transition from a logic "low" level to a logic "high" level for the first time when counting occurs 1024 times in synchronization with the rising edge of the second clock CLK2. The logic bit sets of the division clocks (e.g., DIV1~DIV4096 in FIG. 7) may be set differently depending on counting.

The division control circuit 13 may generate the selection signal MSEL that is deactivated to stop the toggling of the division clock DIV, based on the judgement clock DIV_S, when a lock signal LOCK is activated during the lock detection period.

The division clock generating circuit 15 may be connected to the division control circuit 13 to receive the selection signal MSEL and the division reset signal DRSTB from the division control circuit 13. The division clock generating circuit 15 may initialize the division clock DIV, based on the division reset signal DRSTB that is activated when the initialization operation is performed. The division clock generating circuit 15 may toggle the division clock DIV in synchronization with the second clock CLK2, in response to the selection signal MSEL that is activated during a period from the initiation of the lock detection period until the lock signal LOCK is generated. The division clock generating circuit 15 may stop the toggling of the division clock DIV, in response to the selection signal MSEL that is deactivated when the lock signal LOCK is activated during the lock detection period.

The division clock DIV may include a second division clock DIV2 and a second inverted division clock DIV2B, a fourth division clock DIV4 and a fourth inverted division clock DIV4B, and an "L"$^{th}$ division clock DIVL and an "L"$^{th}$ inverted division clock DIVLB. The frequency of each of the second division clock DIV2 and the second inverted division clock DIV2B may be set to half the frequency of each of the first clock CLK1 and the second clock CLK2. The frequency of each of the fourth division clock DIV4 and the fourth inverted division clock DIV4B may be set to half the frequency of each of the second division clock DIV2 and the second inverted division clock DIV2B. The frequency of each of the "L"$^{th}$ division clock DIVL and the "L"$^{th}$ inverted division clock DIVLB may be set to half the frequency of each of the "L−1"$^{th}$ division clock DIV(L−1) and the "L−1"$^{th}$ inverted division clock DIV(L−1)B.

In this example, the division clock generating circuit 15 is set to toggle the division clock DIV in synchronization with the second clock CLK2, but this is only an example and the division clock generating circuit 15 may be implemented to toggle the division clock DIV in synchronization with any of various internal clocks.

The lock control circuit 17 may be connected to the division clock generating circuit 15 to receive the division clock DIV from the division clock generating circuit 15. The lock control circuit 17 may generate the latch output signal LOUT, the inverted latch output signal LOUTB, the judgement clock DIV_S, and the lock signal LOCK, based on the reset signal RSTB, the division clock DIV, a judgement code JCD, and the second clock CLK2.

The lock control circuit 17 may initialize the latch output signal LOUT, the inverted latch output signal LOUTB, and the lock signal LOCK, in response to the reset signal RSTB that is activated in the initialization operation. The lock control circuit 17 may generate the judgement clock DIV_S that is activated when the lock detection period is initiated and when a certain division clock (e.g., DIV512 in FIG. 19) selected by the judgement code JCD is generated. The lock control circuit 17 may generate the lock signal LOCK that is activated when the judgement clock DIV_S is activated.

FIG. 2 illustrates a clock detecting circuit 11A according to an embodiment. The clock detecting circuit 11A may correspond to the clock detecting circuit 11 shown in FIG. 1.

Referring to FIG. 2, the clock detecting circuit 11A may include a pre-clock detection signal generating circuit (CDET_PRE GEN) 111, a first clock detection signal generating circuit (CDET1 GEN) 113, and a second clock detection signal generating circuit (CDET2 GEN) 115.

The pre-clock detection signal generating circuit 111 may generate the first pre-clock detection signal CDET_PRE1, the second pre-clock detection signal CDET_PRE2, and the clock rest pulse CRSTP, based on the first clock CLK1, the second clock CLK2, and the power voltage VDD. The pre-clock detection signal generating circuit 111 may detect the phases of the first clock CLK1 and the second clock CLK2 to generate the first pre-clock detection signal CDET_PRE1 and the second pre-clock detection signal CDET_PRE2.

The pre-clock detection signal generating circuit 111 may latch the power voltage VDD in synchronization with a preset edge of the first clock CLK1, and output the latched power voltage VDD as the first pre-clock detection signal CDET_PRE1. The pre-clock detection signal generating circuit 111 may detect the preset edge of the first clock CLK1 to generate the activated first pre-clock detection signal CDET_PRE1.

The pre-clock detection signal generating circuit 111 may latch the power voltage VDD in synchronization with a preset edge of the second clock CLK2, and output the latched power voltage VDD as the second pre-clock detection signal CDET_PRE2. The pre-clock detection signal generating circuit 111 may detect the preset edge of the second clock CLK2 to generate the activated second pre-clock detection signal CDET_PRE2.

The pre-clock detection signal generating circuit 111 may generate the activated clock reset pulse CRSTP at a time point when both the preset edge of the first clock CLK1 and the preset edge of the second clock CLK2 are detected and then the preset reset delay period has elapsed.

The first clock detection signal generating circuit 113 may be connected to the pre-clock detection signal generating circuit 111 to receive the first pre-clock detection signal CDET_PRE1 from the pre-clock detection signal generating circuit 111. The first clock detection signal generating circuit 113 may selectively adjust the pulse width of the first pre-clock detection signal CDET_PRE1 to generate the first clock detection signal CDET1. The first clock detection signal generating circuit 113 may output the first pre-clock detection signal CDET_PRE1 as the first clock detection signal CDET1 without adjusting the pulse width of the first pre-clock detection signal CDET_PRE1 when the pulse width of the first pre-clock detection signal CDET_PRE1 is equal to or less than the set pulse width. On the other hand, when the pulse width of the first pre-clock detection signal CDET_PRE1 is greater than the set pulse width, the first clock detection signal generating circuit 113 may adjust the pulse width of the first pre-clock detection signal CDET_PRE1 to match the set pulse width and output, as the first clock detection signal CDET1, the first pre-clock detection signal CDET_PRE1 with the adjusted pulse width.

The second clock detection signal generating circuit 115 may be connected to the pre-clock detection signal generating circuit 111 to receive the second pre-clock detection signal CDET_PRE2 from the pre-clock detection signal generating circuit 111. The second clock detection signal generating circuit 115 may selectively adjust the pulse width of the second pre-clock detection signal CDET_PRE2 to generate the second clock detection signal CDET2. The second clock detection signal generating circuit 115 may output the second pre-clock detection signal CDET_PRE2 as the second clock detection signal CDET2 without adjusting the pulse width of the second pre-clock detection signal CDET_PRE2 when the pulse width of the second pre-clock detection signal CDET_PRE2 is equal to or less than the set pulse width. When the pulse width of the second pre-clock detection signal CDET_PRE2 is greater than the set pulse width, the second clock detection signal generating circuit 115 may adjust the pulse width of the second pre-clock detection signal CDET_PRE2 to match the set pulse width and output, as the second clock detection signal CDET2, the second pre-clock detection signal CDET_PRE2 with the adjusted pulse width.

Figure 3:
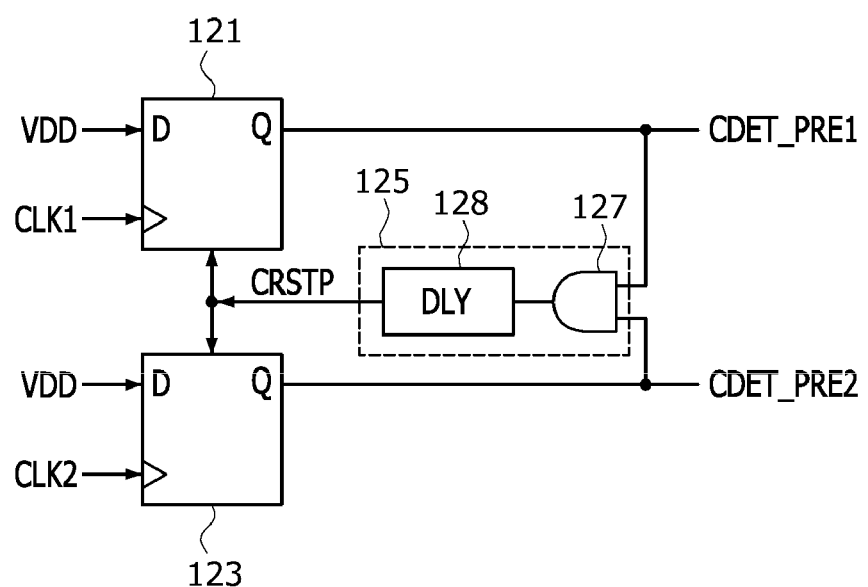
FIG. 3 illustrates a pre-clock detection signal generating circuit included in the clock detecting circuit shown in FIG. 2.

FIG. 3 illustrates a pre-clock detection signal generating circuit 111A according to an embodiment. The pre-clock detection signal generating circuit 111A may correspond to the pre-clock detection signal generating circuit 111 shown in FIG. 2. Referring to FIG. 3, the pre-clock detection signal generating circuit 111A may include a first clock latch 121, a second clock latch 123, and a clock reset pulse generating circuit 125.

The first clock latch 121 may be implemented with a D-flip flop to latch the power voltage VDD in synchronization with a rising edge of the first clock CLK1, and output the latched power voltage VDD as the first pre-clock detection signal CDET_PRE1.

The second clock latch 123 may be implemented with a D-flip flop to latch the power voltage VDD in synchronization with a rising edge of the second clock CLK2, and output the latched power voltage VDD as the second pre-clock detection signal CDET_PRE2.

The clock reset pulse generating circuit 125 may include an AND gate 127 and a delay circuit (DLY) 128. The AND gate 127 may receive the first pre-clock detection signal CDET_PRE1 and the second pre-clock detection signal CDET_PRE2 and perform an AND operation on them. The delay circuit 128 may delay an output signal of the AND gate 127 by a reset delay period to generate the clock reset pulse CRSTP. The clock reset pulse generating circuit 125 may generate the clock reset pulse CRSTP that is activated to a logic "HIGH" level when the reset delay period has elapsed from a time point at which both of the rising edge of the first clock CLK1 and the rising edge of the second clock CLK2 are detected and thus both of the first pre-clock detection signal CDET_PRE1 and the second pre-clock detection signal CDET_PRE2 are generated to a logic "high" level.

The clock reset pulse generating circuit 125 may initialize both the first pre-clock detection signal CDET_PRE1 and the second pre-clock detection signal CDET_PRE2 to a logic "low" level by activating the clock reset pulse CRSTP to the logic "high" level.

Figure 4:
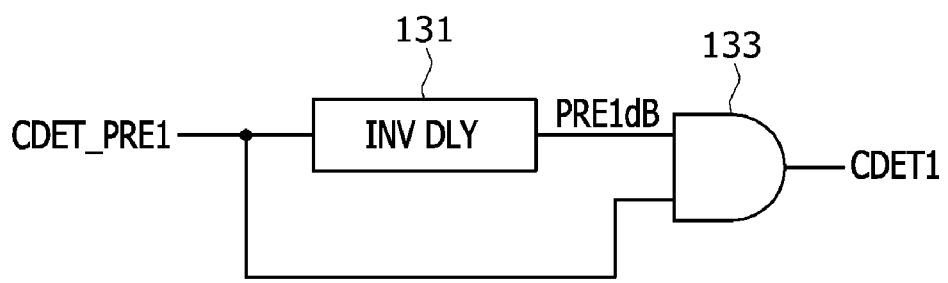
FIG. 4 illustrates a first clock detection signal generating circuit included in the clock detecting circuit shown in FIG. 2.

FIG. 4 illustrates a first clock detection signal generating circuit 113A according to an embodiment. The first clock detection signal generating circuit 113A may correspond to the first clock detection signal generating circuit 113 shown in FIG. 2. Referring to FIG. 4, the first clock detection signal generating circuit 113A may include an inversion delay circuit 131 and an AND gate 133.

The inversion delay circuit 131 may invert the first pre-clock detection signal CDET_PRE1 and delay the inverted first pre-clock detection signal by the set pulse width to generate a first inverted delay pre-signal PRE1dB. The AND gate 133 may receive the first inverted delay pre-signal PRE1dB and the first pre-clock detection signal CDET_PRE1 and perform an AND operation on them to generate the first clock detection signal CDET1.

The first clock detection signal generating circuit 113A may selectively adjust the pulse width of the first pre-clock detection signal CDET_PRE1 to generate the first clock detection signal CDET1. The first clock detection signal generating circuit 113A may output the first pre-clock detection signal CDET_PRE1 as the first clock detection signal CDET1 without adjusting the pulse width of the first pre-clock detection signal CDET_PRE1 when the pulse width of the first pre-clock detection signal CDET_PRE1 is equal to or less than the set pulse width. On the other hand, when the pulse width of the first pre-clock detection signal CDET_PRE1 is greater than the set pulse width, the first clock detection signal generating circuit 113A may adjust the pulse width of the first pre-clock detection signal CDET_PRE1 to match the set pulse width and output, as the first clock detection signal CDET1, the first pre-clock detection signal CDET_PRE1 with the adjusted pulse width.

Figure 5:
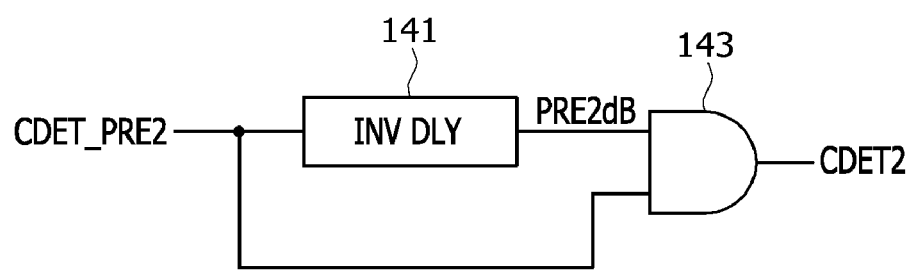
FIG. 5 illustrates a second clock detection signal generating circuit included in the clock detecting circuit shown in FIG. 2.

FIG. 5 illustrates a second clock detection signal generating circuit 115A according to an embodiment. The second clock detection signal generating circuit 115A may correspond to the second clock detection signal generating circuit 115 shown in FIG. 2. Referring to FIG. 5, the second clock detection signal generating circuit 115A may include an inversion delay circuit 141 and an AND gate 143.

The inversion delay circuit 141 may invert the second pre-clock detection signal CDET_PRE2 and delay the inverted second pre-clock detection signal by the set pulse width to generate a second inverted delay pre-signal PRE2dB. The AND gate 143 may receive the second inverted delay pre-signal PRE2dB and the second pre-clock detection signal CDET_PRE2 and perform an AND operation on them to generate the second clock detection signal CDET2.

The second clock detection signal generating circuit 115A may selectively adjust the pulse width of the second pre-clock detection signal CDET_PRE2 to generate the second clock detection signal CDET2. The second clock detection signal generating circuit 115A may output the second pre-clock detection signal CDET_PRE2 as the second clock detection signal CDET2 without adjusting the pulse width of the second pre-clock detection signal CDET_PRE2 when the pulse width of the second pre-clock detection signal CDET_PRE2 is equal to or less than the set pulse width. On the other hand, when the pulse width of the second pre-clock detection signal CDET_PRE2 is greater than the set pulse width, the second clock detection signal generating circuit 115A may adjust the pulse width of the second pre-clock detection signal CDET_PRE2 to match the set pulse width and output, as the second clock detection signal CDET2, the second pre-clock detection signal CDET_PRE2 with the adjusted pulse width.

Figure 6:
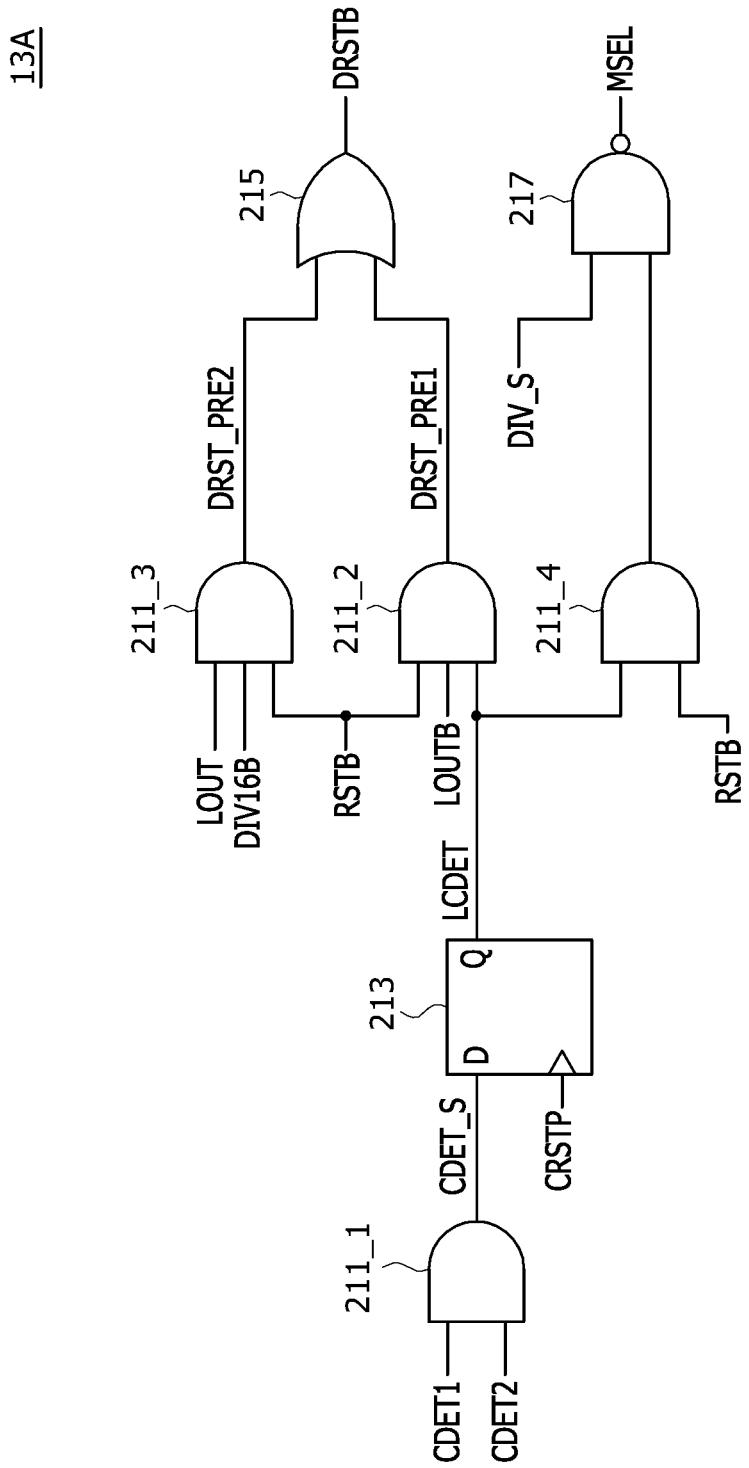
FIG. 6 illustrates a division control circuit included in the lock detecting circuit shown in FIG. 1.

FIG. 6 illustrates a division control circuit 13A according to an embodiment. The division control circuit 13A may correspond to the division control circuit 13 shown in FIG. 1. Referring to FIG. 6, the division control circuit 13A may include AND gates 211_1, 211_2, 211_3, and 211_4, a clock detection signal latch 213, an OR gate 215, and a NAND gate 217.

The AND gate 211_1 may receive the first clock detection signal CDET1 and the second clock detection signal CDET2 and perform an AND operation on them to generate a composite clock detection signal CDET_S. The clock detection signal latch 213 may be implemented with a D-flip flop to latch the composite clock detection signal CDET_S when the clock reset pulse CRSTP is activated and to output the latched composite clock detection signal CDET_S as the latch clock detection signal LCDET.

The AND gate 211_2 may receive the latch clock detection signal LCDET, the inverted latch output signal LOUTB, and the reset signal RSTB and perform an AND operation on them to generate a first pre-division reset signal DRST_PRE1. The AND gate 211_3 may receive the latch output signal LOUT, a sixteenth inverted division clock DIV16B, and the reset signal RSTB and perform an AND operation on them to generate a second pre-division reset signal DRST_PRE2. The OR gate 215 may receive the first pre-division reset signal DRST_PRE1 from the AND gate 211_2 and the second pre-division reset signal DRST_PRE2 from the AND gate 211_3 and perform an OR operation on them to generate the division reset signal DRSTB. The AND gate 211_4 may receive the latch clock detection signal LCDET and the reset signal RSTB and perform an AND operation on them. The NAND gate 217 may receive an output signal of the AND gate 211_4 and the adjustment clock DIV_S and perform a NAND operation on them to generate the selection signal MSEL.

In the initialization operation, the division control circuit 13A may generate the first pre-division reset signal DRST_PRE1 and the second pre-division reset signal DRST_PRE2 that have a logic "low" level through the AND gates 211_2 and 211_3 by the reset signal RSTB, which is activated to a logic "low" level, and thus generate the division reset signal DRSTB that is activated to a logic "low" level through the OR gate 215 to initialize the division clock DIV.

The division control circuit 13A may generate the composite clock detection signal CDET_S that is activated to a logic "high" level through the AND gate 211_1 by the first clock detection signal CDET1 and the second clock detection signal CDET2. Both the first clock detection signal CDET1 and the second clock detection signal CDET2 are activated to a logic "high" level when the phase difference between the first clock CLK1 and the second clock CLK2 is equal to or less than a set phase difference.

The division control circuit 13A may initiate the lock detection period by generating the latch clock detection signal LCDET that is activated to a logic "high" level. The activated latch clock detection signal LCDET is generated when the clock reset pulse CRSTP, which is activated to a logic "high" level, is received while the composite clock detection signal CDET_S is at a logic "high" level.

The division control circuit 13A may generate the division reset signal DRSTB that is deactivated to a logic "high" level through the AND gate 211_2 and the OR gate 215. The division control circuit 13A may generate the selection signal MSEL, which is activated to a logic "high" level, through the AND gate 211_4 and the NAND gate 217. This occurs while the judgement clock DIV_S is deactivated to a logic "low" level during the lock detection period, ensuring the toggling of the division clock DIV continues. Meanwhile, the division control circuit 13A may generate the selection signal MSEL, which is deactivated to a logic "low" level through the AND gate 211_4 and the NAND gate 217. This occurs when the judgement clock DIV_S is activated to a logic "high" level during the lock detection period, halting the toggling of the divided clock DIV.

Figure 7:
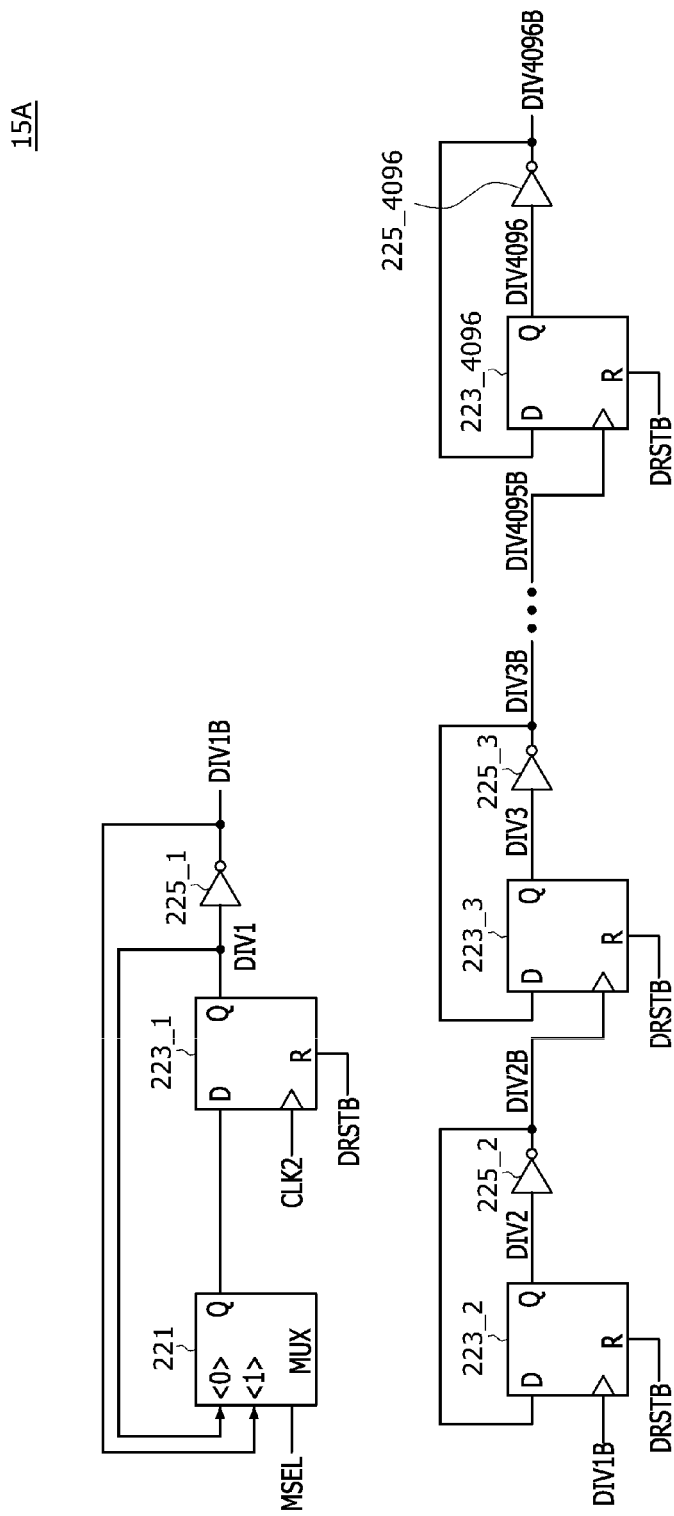
FIG. 7 illustrates a division clock generating circuit included in the lock detecting circuit shown in FIG. 1.

FIG. 7 illustrates a division clock generating circuit 15A according to an embodiment. The division clock generating circuit 15A may correspond to the division clock generating circuit 15 shown in FIG. 1. Referring to FIG. 7, the division clock generating circuit 15A may include a division clock selector 221, division clock latches 223_1~223_4096, and inverters 225_1~225_4096.

The division clock selector 221 may select and output one of a first division clock DIV1 and a first inverted division clock DIV1B in response to the selection signal MSEL. The division clock selector 221 may select and output the first division clock DIV1 when the selection signal MSEL is deactivated to a logic "low" level, and select and output the first inverted division clock DIVB when the selection signal MSEL is activated to a logic "high" level.

The division clock latch 223_1 may latch an output signal of the division clock selector 221 in synchronization with the second clock CLK2, and output the latched output signal of the division clock selector 221 as the first division clock DIV1. The inverter 225_1 may inversely buffer the first division clock DIV1 to generate the first inverted division clock DIV1B.

The division clock latch 223_2 may latch a second inverted division clock DIV2B in synchronization with the first inverted division clock DIV1B, and output the latched second inverted division clock DIV2B as a second division clock DIV2. The inverter 225_2 may inversely buffer the second division clock DIV2 to generate the second inverted division clock DIV2B.

The division clock latch 223_3 may latch a third inverted division clock DIV3B in synchronization with the second inverted division clock DIV2B, and output the latched third inverted division clock DIV3B as a third division clock DIV3. The inverter 225_3 may inversely buffer the third division clock DIV3 to generate the third inverted division clock DIV3B.

The division clock latch 223_4096 may latch a $4096^{th}$ inverted division clock DIV4096B in synchronization with a $4095^{th}$ inverted division clock DIV4095B, and output the latched $4096^{th}$ inverted division clock DIV4096B as a $4096^{th}$ division clock DIV4096. The inverter 225_4096 may inversely buffer the $4096^{th}$ division clock DIV4096 to generate the $4096^{th}$ inverted division clock DIV4096B.

When the initialization operation is performed and thus the division reset signal DRSTB set to a logic "low" level is received, the division clock generating circuit 15A may initialize the first to 4096$^{th}$ division clocks DIV1~DIV4096 to a logic "low" level and the first to 4096$^{th}$ inverted division clocks DIV1B~DIV4096B to a logic "high" level through the division clock latches 223_1~223_4096 and the inverters 225_1~225_4096.

The division clock generating circuit 15A may receive the selection signal MSEL activated to a logic "high" level and the division reset signal DRSTB deactivated to a logic "high" level during a period from the initiation of the lock detection period until the activation of the lock signal LOCK to a logic "high" level, thereby toggling the first to 4096$^{th}$ division clocks DIV1~DIV4096 and the first to 4096$^{th}$ inverted division clocks DIV1B~DIV4096B.

Figure 8:
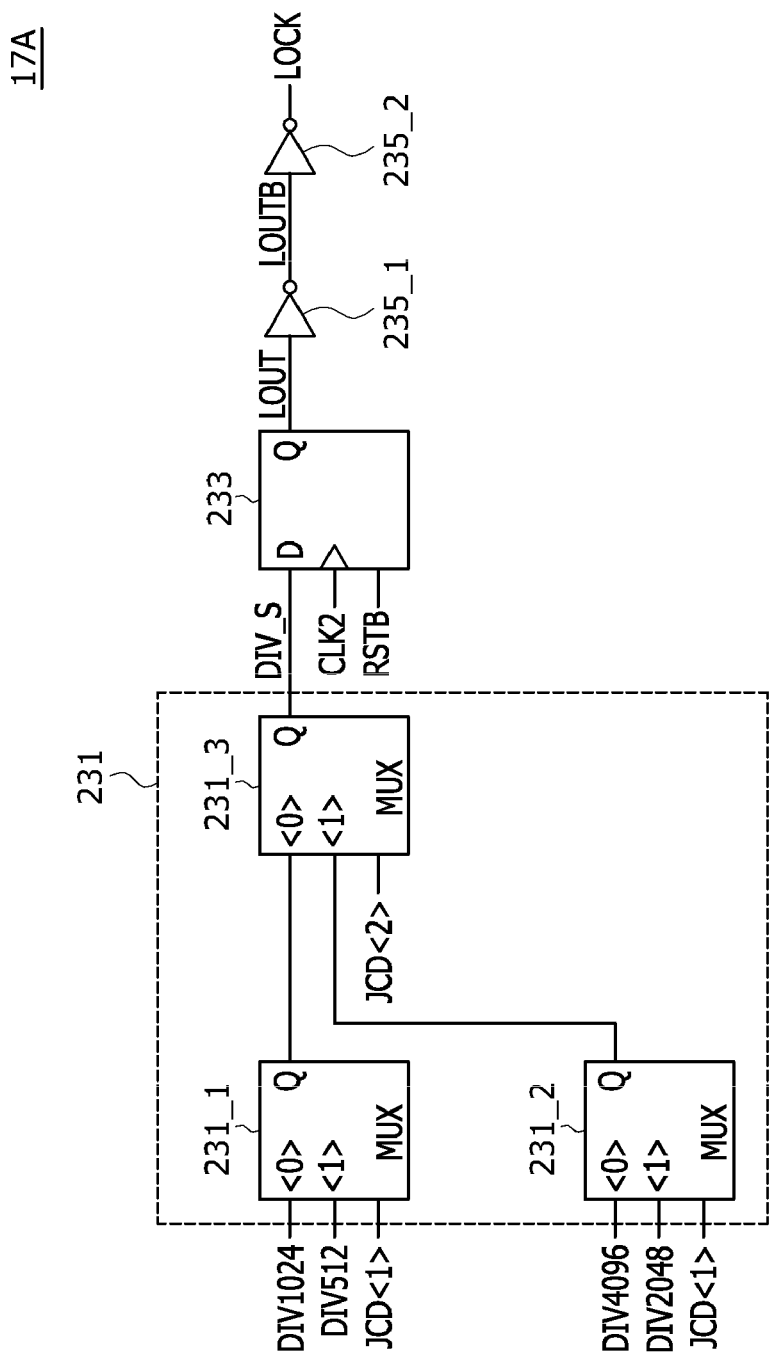
FIG. 8 illustrates a lock control circuit included in the lock detecting circuit shown in FIG. 1.

FIG. 8 illustrates a lock control circuit 17A according to an embodiment. The lock control circuit 17A may correspond to the lock control circuit 17 shown in FIG. 1. Referring to FIG. 8, the lock control circuit 17A may include a judgement clock generating circuit 231, a judgement clock latch 233, and inverters 235_1 and 235_2.

The judgement clock generating circuit 231 may include first to third judgement clock selectors 231_1~231_3. The first judgement clock selector 231_1 may select and output one of a 1024$^{th}$ division clock DIV1024 and a 512$^{th}$ division clock DIV512, based on a first bit JCD<1> of the judgement code JCD.

The second judgement clock selector 231_2 may select and output one of a 4096$^{th}$ division clock DIV4096 and a 2048$^{th}$ division clock DIV2048, based on the first bit JCD<1> of the judgement code JCD.

The third judgement clock selector 231_3 may select one of an output signal of the first judgement clock selector 231_1 and an output signal of the second judgement clock selector 231_2, based on a second bit JCD<2> of the judgement code JCD and output the selected signal as the judgement clock DIV_S. Therefore, the third judgement clock selector 231_3 may select and output one of the 512$^{th}$ division clock DIV512, the 1024$^{th}$ division clock DIV1024, the 2048$^{th}$ division clock DIV 2048, and the 4096$^{th}$ division clock DIV4096 as the judgement clock DIV_S, based on the first bit JCD<1> and the second bit JCD<2> of the judgement code JCD.

For example, the judgement clock generating circuit 231 may select and output the 1024$^{th}$ division clock DIV1024 when both the first bit JCD<1> and the second bit JCD<2> are at logic "low" levels. The judgement clock generating circuit 231 may select and output the 512$^{th}$ division clock DIV512 as the judgement clock DIV_S when the first bit JCD<1> is at a logic "high" level and the second bit JCD<2> is at a logic "low" level. The judgement clock generating circuit 231 may select and output the 4096$^{th}$ division clock DIV4096 as the judgement clock DIV_S when the first bit JCD<1> is at a logic "low" level and the second bit JCD<2> is at a logic "high" level. The judgement clock generating circuit 231 may select and output the 2048$^{th}$ division clock DIV2048 as the judgement clock DIV_S when both the first bit JCD<1> and the second bit JCD<2> are at logic "high" levels.

The judgement clock latch 233 may latch the judgement clock DIV_S in synchronization the second clock CLK2, and output the latched judgement clock DIV_S as the latch output signal LOUT. The inverter 235_1 may inversely buffer the latch output signal LOUT to generate the inverted latch output signal LOUTB. The inverter 235_2 may inversely buffer the inverted latch output signal LOUTB to generate the lock signal LOCK. When the initialization operation is performed and thus the reset signal RSTB set to a logic "low" level is received, the lock control circuit 17A may set the latch output signal LOUT to a logic "low" level, set the inverted latch output signal LOUTB to a logic "high" level, and thus generate the lock signal LOCK that is disabled to a logic "low" level.

When the lock detection period is initiated, the first to 4096$^{th}$ division clocks DIV1~DIV4096 and the first to 4096$^{th}$ inverted division clocks DIV1B~DIV4096B are toggled, and the judgement clock DIV_S selected by the first bit JCD<1> and the second bit JCD<2> of the judgement code JCD is activated to a logic "high" level. The lock control circuit 17A may set the latch output signal LOUT to a logic "high" level, set the inverted latch output signal LOUTB to a logic "low" level, and generate the lock signal LOCK that is activated to a logic "high" level.

Figure 9:
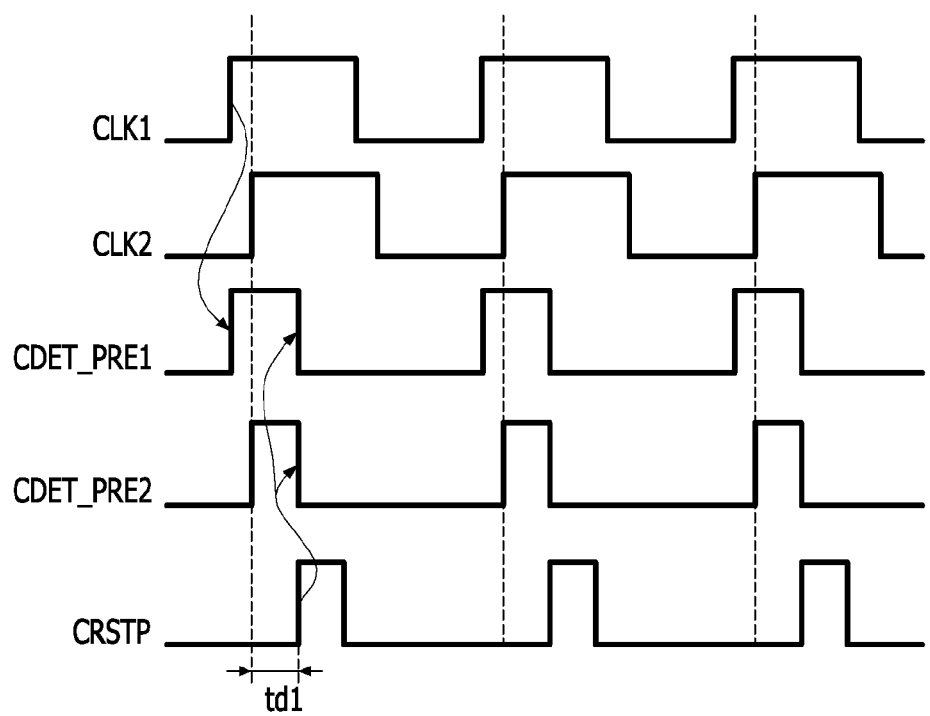
FIGS. 9 to 11 are timing diagrams illustrating operations of the clock detecting circuit shown in FIG. 2.
Figure 10:
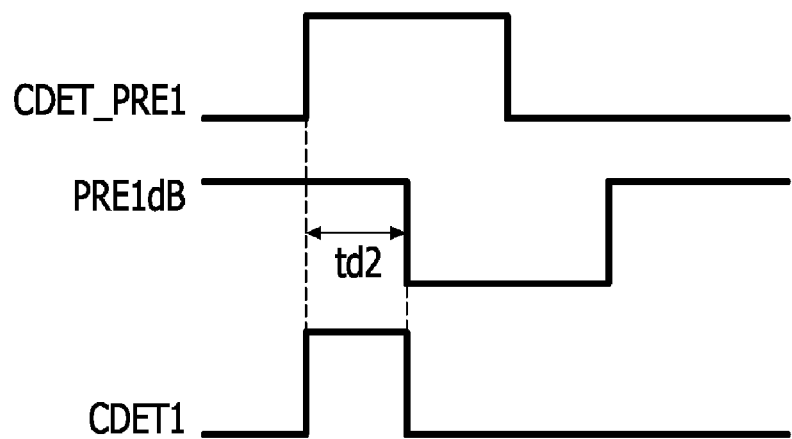
Figure 11:
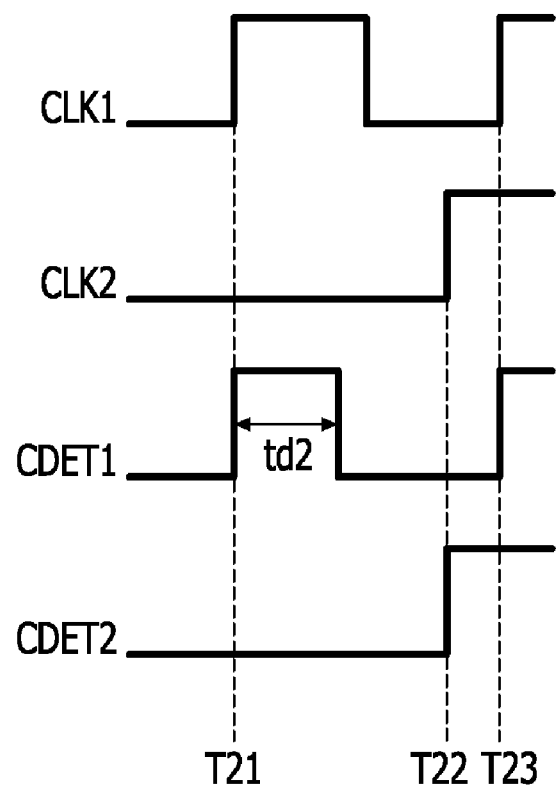

FIGS. 9 to 11 are timing diagrams illustrating the operation of the clock detecting circuit 11A shown in FIG. 2. The operation of the clock detecting circuit 11A will be described in more detail with reference to FIGS. 2, 4, and 9 to 11 as follows.

Referring to FIGS. 2 and 9, the pre-clock detection signal generating circuit 111 may detect the rising edge of the first clock CLK1 to generate the first pre-clock detection signal CDET_PRE1 that is activated to a logic "high" level, and detect the rising edge of the second clock CLK2 to generate the second pre-clock detection signal CDET_PRE2 that is activated to a logic "high" level. In addition, the pre-clock detection signal generating circuit 111 may generate the clock reset pulse CRSTP that is activated to a logic "high" level at the time point when both a rising edge of the first clock CLK1 and a rising edge of the second clock CLK2 are detected and then a reset delay period td1 has elapsed. The pulse width of the clock reset pulse CRSTP may be set to be equal to or smaller than a pulse width of the second pre-clock detection signal CDET_PRE2. The pulse width of the second pre-clock detection signal CDET_PRE2 may be smaller than a pulse width of the first pre-clock detection signal CDET_PRE1. The pre-clock detection signal generating circuit 111 may initialize both the first pre-clock detection signal CDET_PRE1 and the second pre-clock detection signal CDET_PRE2 to a logic "low" level when the clock reset pulse CRSTP is activated to a logic "high" level.

Referring to FIGS. 4 and 10, the first clock detection signal generating circuit 113A may invert the first pre-clock detection signal CDET_PRE1, delay the inverted pre-clock detection signal by a set pulse width td2 to generate the first inverted delay pre-signal PRE1dB, and then perform an AND operation on the first pre-clock detection signal CDET_PRE1 and the first inverted delay pre-signal PRE1dB, such that it generates the first clock detection signal CDET1 whose pulse width is equal to or less than the set pulse width td2. When the pulse width of the first pre-clock detection signal CDET_PRE1 is greater than the set pulse width td2, the first clock detection signal generating circuit 113A may adjust the pulse width of the first pre-clock detection signal CDET_PRE1 to match the set pulse width td2 and output, as the first clock detection signal CDET1, the first pre-clock detection signal CDET_PRE1 with the adjusted pulse width. On the other hand, when the pulse width of the first pre-clock detection signal CDET_PRE1 is equal to or smaller than the set pulse width td2, the first clock detection signal generating circuit 113A may output the first pre-clock detection signal CDET_PRE1 as the first clock detection signal CDET1 without adjusting the pulse width of the first pre-clock detection signal CDET_PRE1.

Referring to FIGS. 10 and 11, the first clock detection signal CDET1, which is generated at a time point T21 by detecting the rising edge of the first clock CLK1, may have the pulse width that is equal to or less than the set pulse width td2. In a situation where the rising edges of the first clock CLK1 are detected consecutively at time points T21 and T23 and the rising edge of the second clock CLK2 is detected at time point T22, if the pulse width of the first clock detection signal CDET1 is not adjusted, the pulse width of the first clock detection signal CDET1 may be set at the time point T23 or later. This is because the first clock detection signal CDET1 is deactivated to a logic "low" level when the reset delay period has elapsed after both the first clock detection signal CDET1 and the second clock detection signal CDET2 are activated to a logic "high" level. Therefore, as the pulse width of the first clock detection signal CDET1 is adjusted to be equal to or less than the set pulse width td2, the first clock detection signal CDET1 may be activated to the logic "high" level again by detecting the rising edge of the first clock CLK1 at time point T23.

To summarize the above, the clock detecting circuit 11A may adjust the pulse width of each of the first clock detection signal CDET1 and the second clock detection signal CDET2 to be equal to or less than the set pulse width td2, thereby detecting the rising edge of the first clock CLK1 and the rising edge of the second clock CLK2 accurately.

Figure 12:
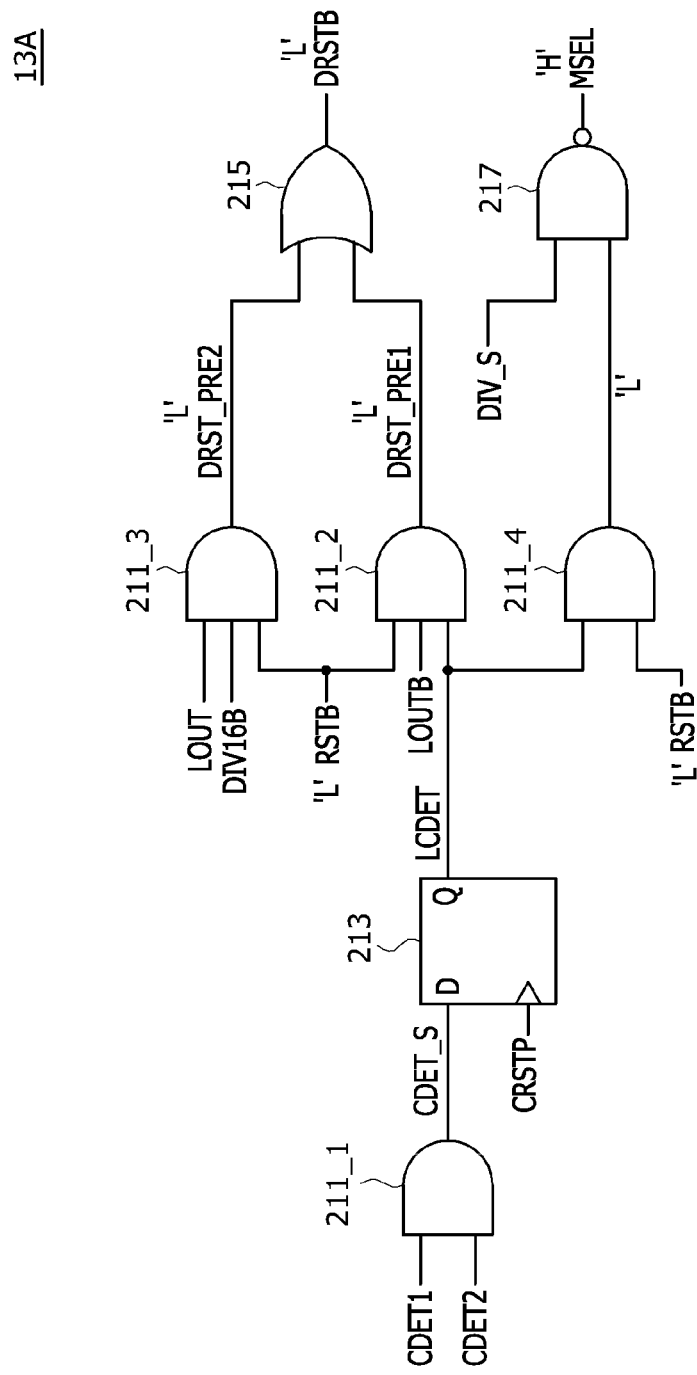
FIGS. 12 to 14 illustrate an initialization operation of the lock detecting circuit shown in FIG. 1.
Figure 13:
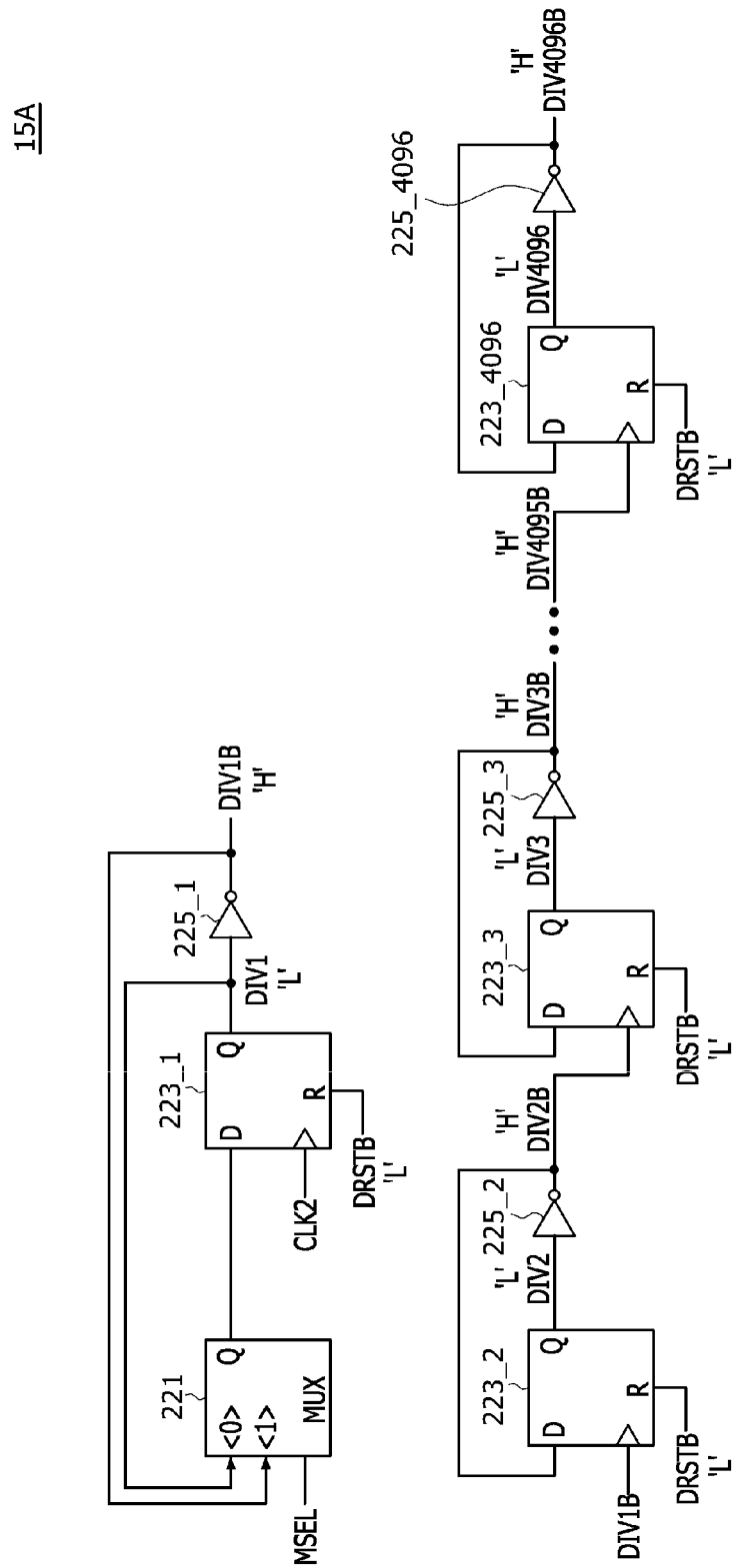
Figure 14:
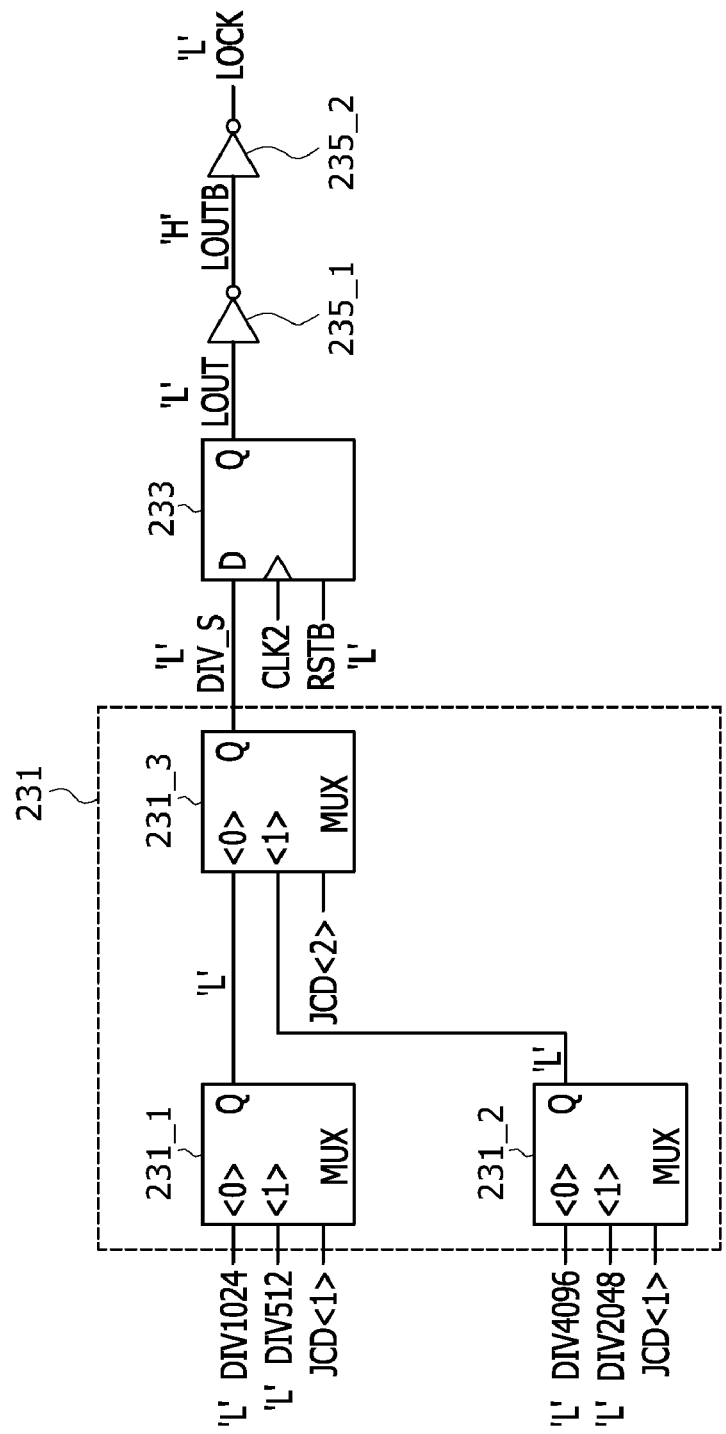

FIGS. 12 to 14 illustrate the initialization operation of the lock detecting circuit 1 shown in FIG. 1. The initialization operation of the lock detecting circuit 1 will be described in more detail with reference to FIGS. 12 to 14 as follows.

First, referring to FIG. 12, in the initialization operation, the division control circuit 13A generates the first pre-division reset signal DRST_PRE1 and the second pre-division reset signal DRST_PRE2, both of which are set to a logic "low" level 'L' through the AND gates 211_2 and 211_3 by the reset signal RSTB that is activated to a logic "low" level 'L', and initialize the division clock DIV by generating the division reset signal DRSTB that is activated to a logic "low" level 'L' through the OR gate 215. In the initialization operation, the division control circuit 13A generates the selection signal MSEL that is activated to a logic "high" level 'H' through the AND gate 211_4 and the NAND gate 217 by the reset signal RSTB that is activated to a logic "low" level 'L'.

Next, referring to FIG. 13, the division clock generating circuit 15A initializes the first to 4096$^{th}$ division clocks DIV1~DIV4096 to a logic "low" level 'L' and initializes the first to 4096$^{th}$ inverted division clocks DIV1B~DIV4096B to a logic "high" level 'H' through the division clock latches 223_1~223_4096 and the inverters 225_1~225_4096 when the initialization operation is performed and thus the division reset signal DRSTB set to a logic "low" level 'L' is received.

Finally, referring to FIG. 14, the lock control circuit 17A may generate the judgement clock DIV_S that is deactivated to a logic "low" level 'L' when the initialization operation is performed and thus the first to 4096$^{th}$ division clocks DIV1~DIV4096, all initialized to a logic "low" level 'L', are received. The lock control circuit 17A may set the latch output signal LOUT to a logic "low" level 'L' by the reset signal RSTB activated to a logic "low" level 'L', set the inverted latch output signal LOUTB to a logic "high" level 'H', and generate the lock signal LOCK that is deactivated to a logic "low" level 'L'.

FIGS. 15 to 22 illustrate the lock signal generation operation of the lock detecting circuit 1 shown in FIG. 1.

The lock signal generation operation of the lock detecting circuit 1 will be described with reference to FIGS. 15 to 22 in more detail as follows.

Figure 15:
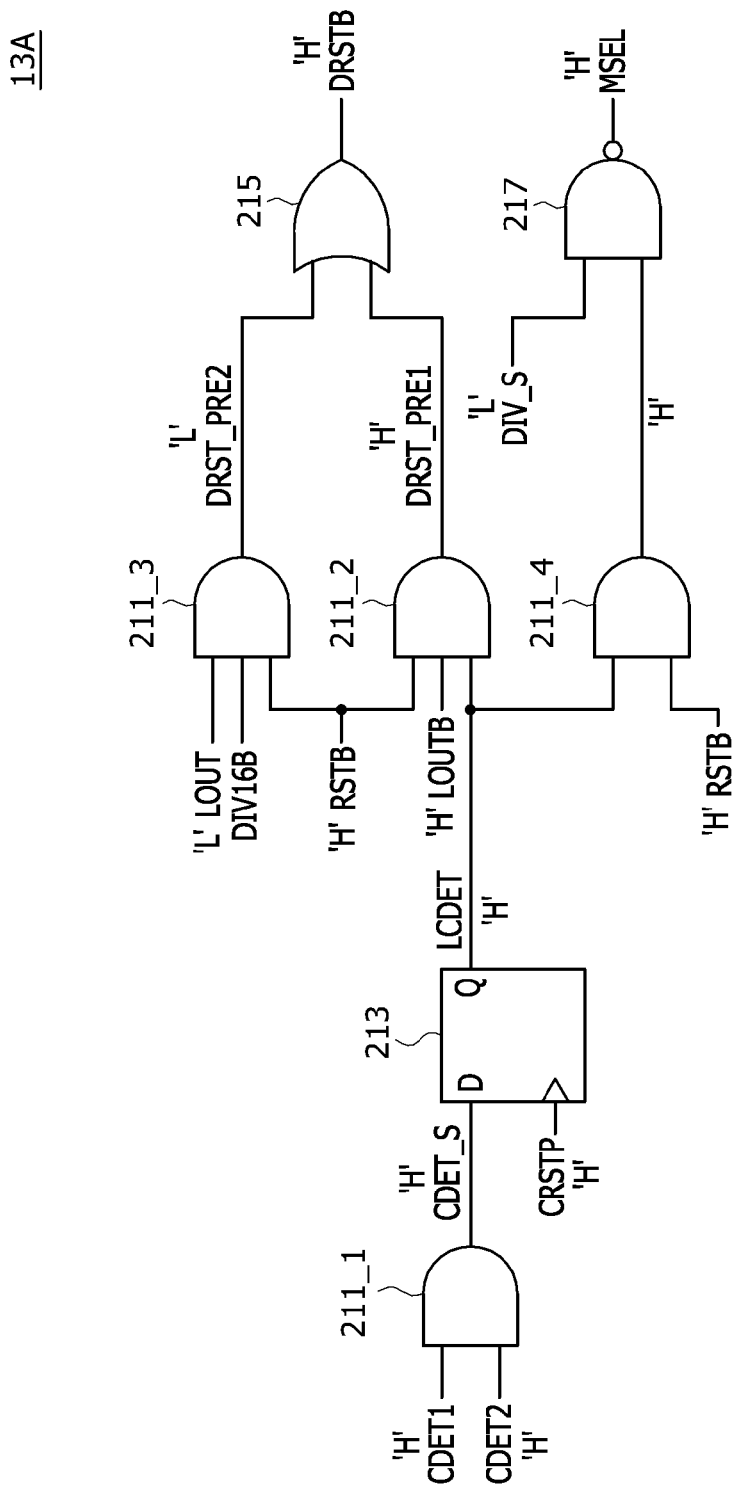

First, referring to FIG. 15, the division control circuit 13A generates the composite clock detection signal CDET_S that is activated to a logic "high" level 'H' through the AND gate 211_1 by the first clock detection signal CDET1 and the second clock detection signal CDET2 both set to logic "high" levels 'H' while the phase difference between the first clock CLK1 and the second clock CLK2 is equal to or less than the set phase difference. The division control circuit 13A may initiate the lock detection period by generating the latch clock detection signal LCDET that is activated to a logic "high" level 'H' when the clock reset pulse CRSTP activated to a logic "high" level 'H' is received while the composite clock detection signal CDET_S is at a logic "high" level 'H', and generate the division reset signal DRSTB that is deactivated to a logic "high" level 'H' through the AND gate 211_2 and the OR gate 215. The division control circuit 13A may cause the division clock generating circuit 15A to continue the toggling of the division clock DIV by generating the selection signal MSEL that is activated to a logic "high" level 'H' through the AND gate 211_4 and the NAND gate 217 during the lock detection period while the judgement clock DIV_S is at a logic "low" level 'L'.

Figure 16:
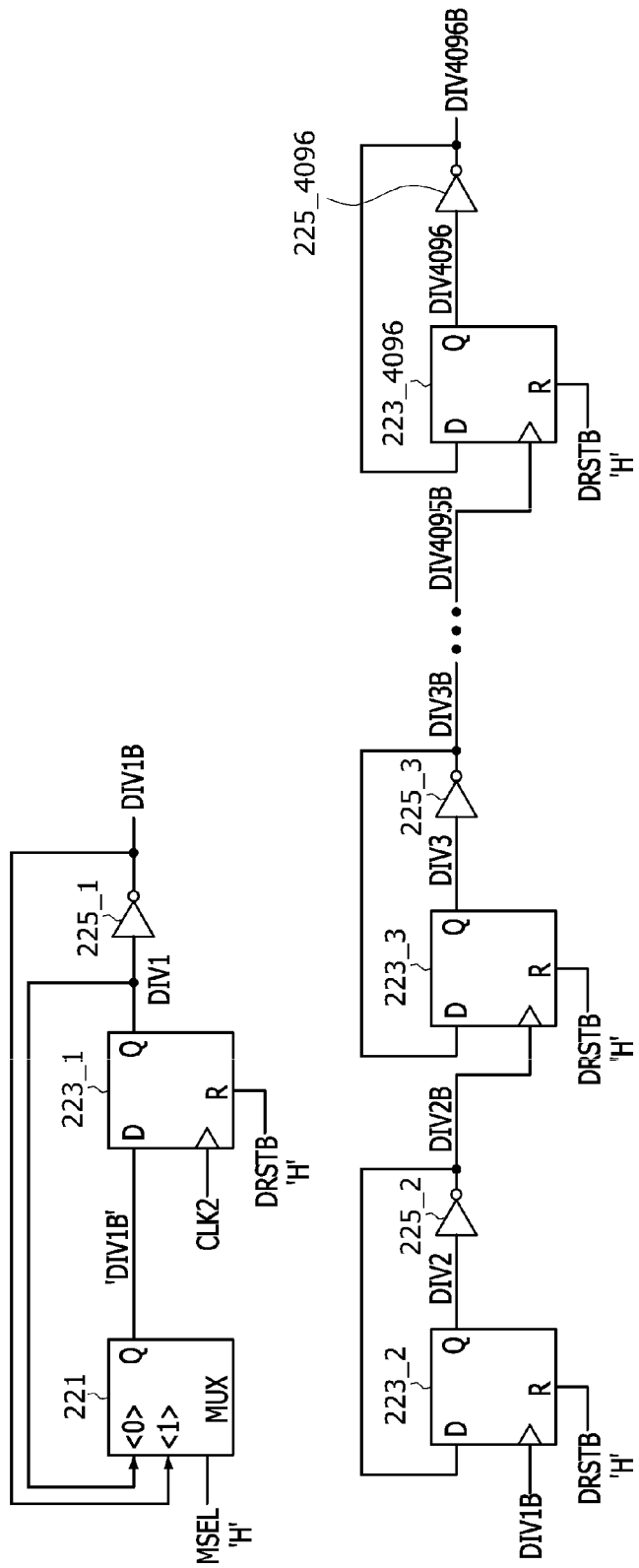

Next, referring to FIG. 16, the division clock generating circuit 15A may receive the selection signal MSEL activated to a logic "high" level 'H' and the division reset signal DRSTB deactivated to a logic "high" level 'H' during a given period between the initiation of the lock detection period and the activation of the lock signal LOCK to a logic "high" level 'H'. During the given period, the first to 4096$^{th}$ division clocks DIV1~DIV4096 and the first to 4096$^{th}$ inverted division clocks DIV1B~DIV4096B are toggled. The given period may correspond to the lock detection period.

Figure 18:
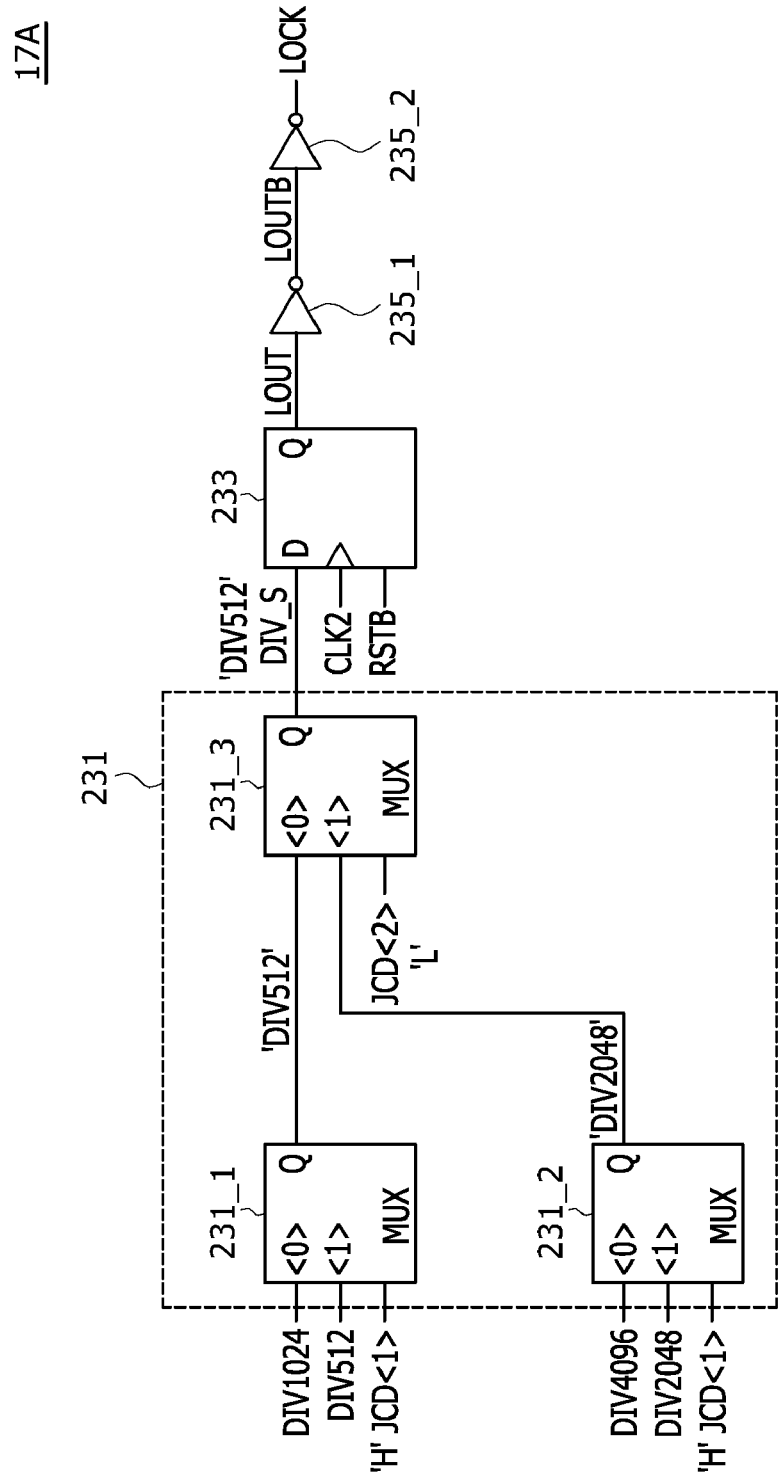

Next, referring to FIGS. 17 and 18, the lock control circuit 17A may select, as the judgement clock DIV_S, one of the 512$^{th}$ division clock DIV512, the 1024$^{th}$ division clock DIV1024, the 2048$^{th}$ division clock DIV2048, and the 4096$^{th}$ division clock DIV4096 according to the logic bit set of the first bit JCD<1> and the second bit JCD<2> of the judgement code JCD when the lock detection period is initiated. For example, when the first bit JCD<1> of the judgement code JCD is set to have a logic "high" level 'H' and the second bit JCD<2> of the judgement code JCD is set to have a logic "low" level 'L', the lock control circuit 17A selects the 512$^{th}$ division clock DIV512 as the judgement clock DIV_S.

Figure 19:
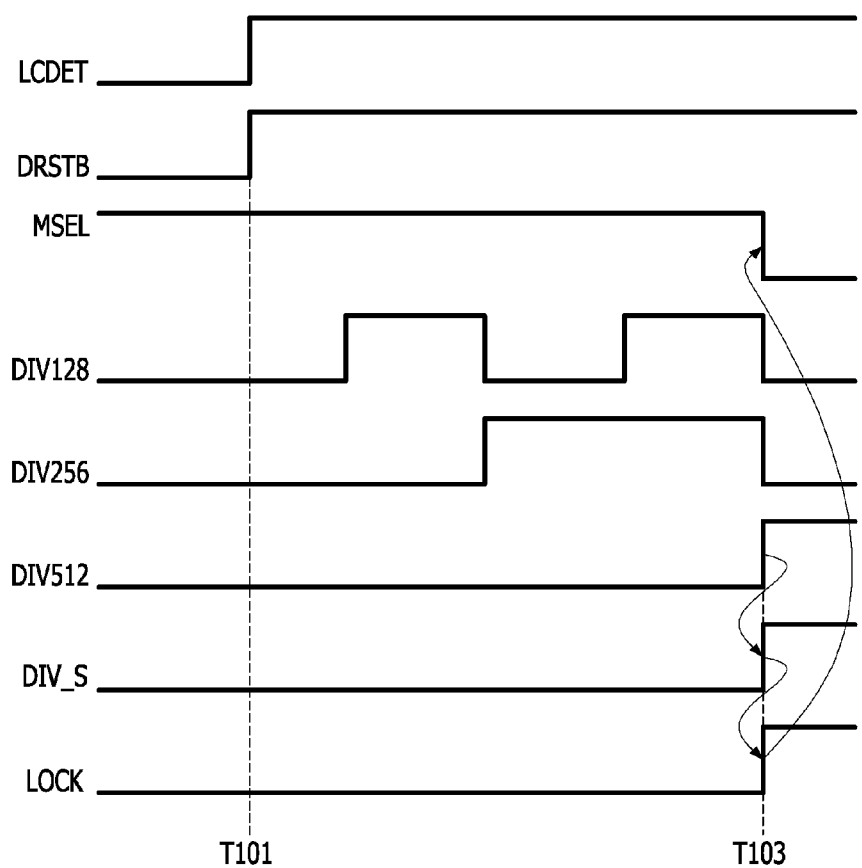
Figure 20:
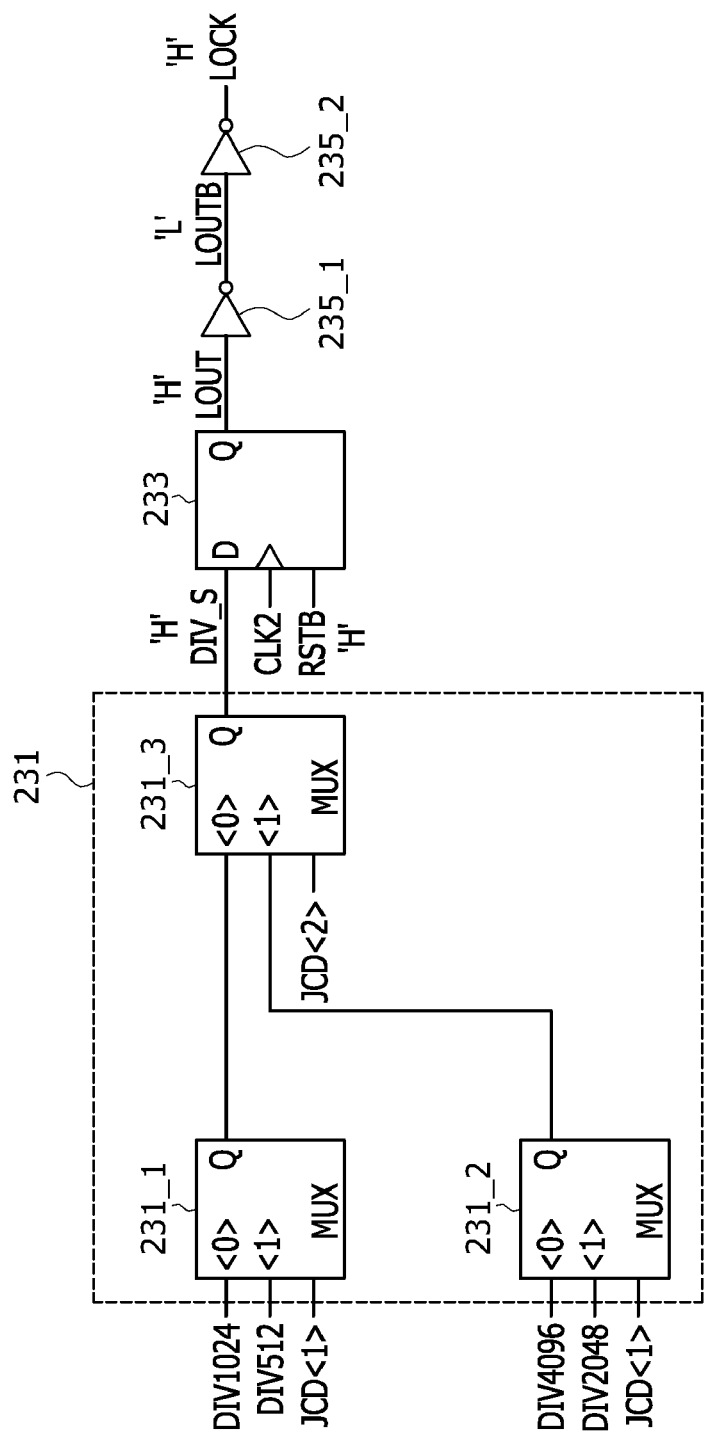

Meanwhile, referring to FIGS. 19 and 20, when the lock detection period is initiated at a time point T101 by the latch clock detection signal LCDET activated to a logic "high" level, the division reset signal DRSTB is deactivated to a logic "high" level, and the selection signal MSEL is activated to a logic "high" level. Consequently, the 128$^{th}$ division clock DIV128, the 256$^{th}$ division clock DIV256, and the 512$^{th}$ division clock DIV512 may be sequentially toggled. At a time point T103, because the 512$^{th}$ division clock DIV512 selected by the first bit JCD<1> and the second bit JCD<2> of the judgement code JCD is toggled to a logic "high" level 'H', the lock control circuit 17A may generate the judgement clock DIV_S that is activated to a logic "high" level 'H', set the latch output signal LOUT to a logic "high" level 'H', set the inverted latch output signal LOUTB to a logic "low" level 'L', and generate the lock signal LOCK that is activated to a logic "high" level 'H'.

Figure 21:
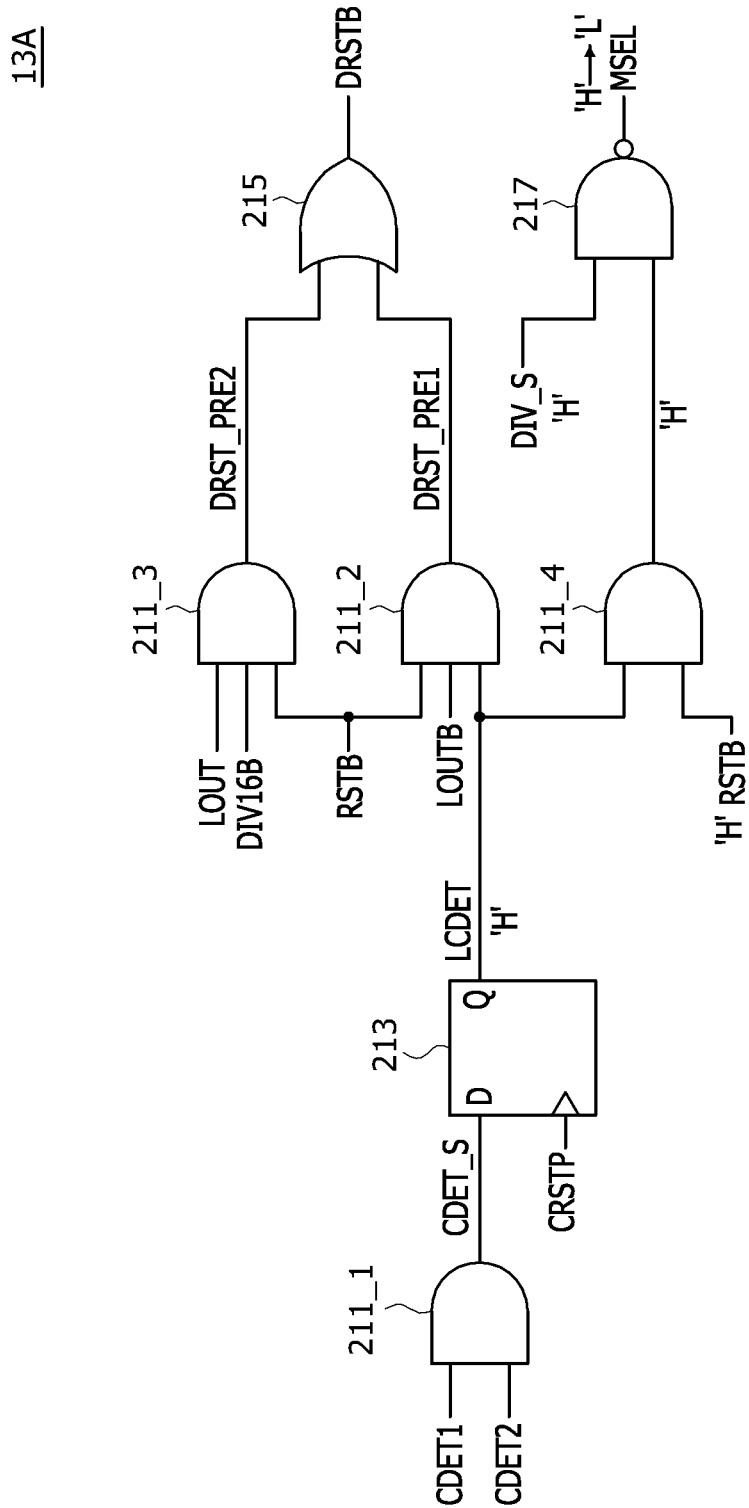
Figure 22:
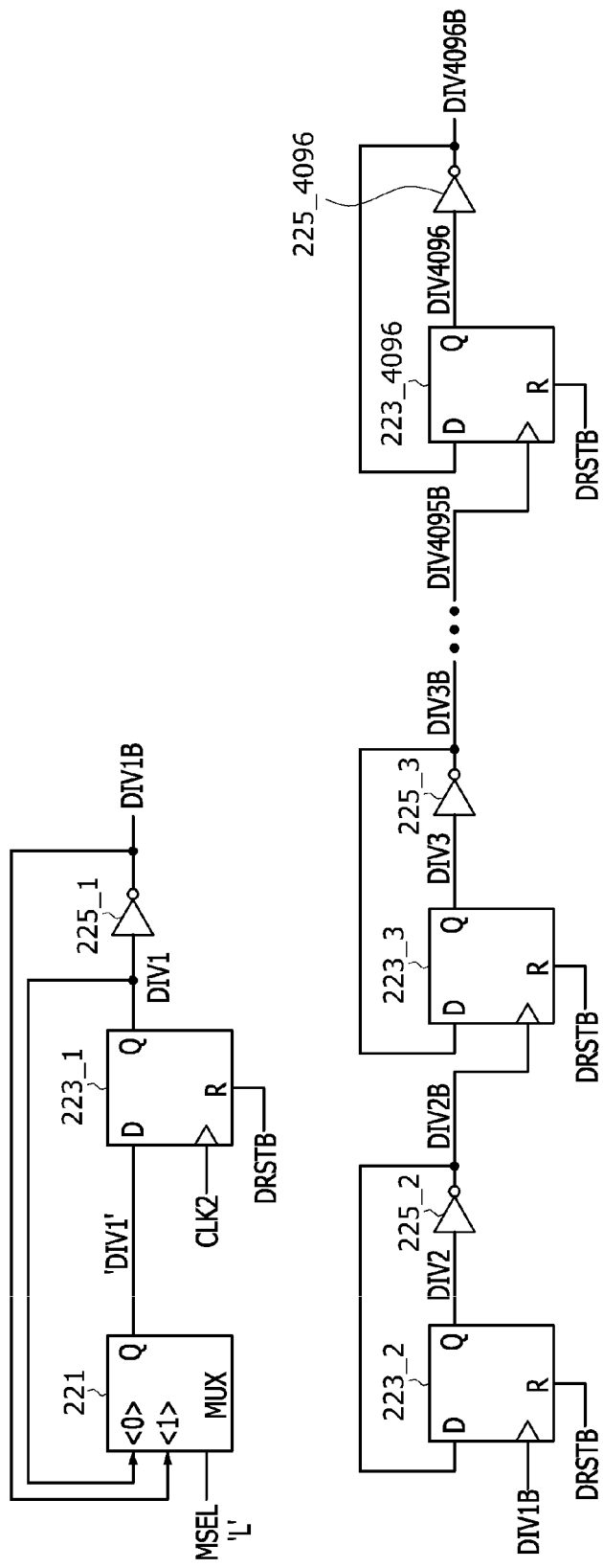

In addition, referring to FIGS. 21 and 22, the division control circuit 13A may generate the selection signal MSEL that is deactivated to a logic "low" level 'L' through the AND gate 211_4 and the NAND gate 217 when the judgement clock DIV_S is activated to a logic "high" level 'H' during the lock detection period. The division clock generating circuit 15A may receive the selection signal MSEL that is deactivated to a logic "low" level 'L' when the lock detection period is initiated and then the lock signal LOCK is activated at a logic "high" level, and stop the toggling of the first to 4096$^{th}$ division clocks DIV1~DIV4096 and the first to 4096$^{th}$ inverted division clocks DIV1B~DIV4096B in response to the selection signal MSEL that is deactivated.

The lock detecting circuit 1 configured as described above may control the lock signal LOCK to be activated when the judgement clock DIV_S selected by the judgement code JCD is activated after the lock detection period is initiated, thereby ensuring the reliability of the lock signal LOCK.

Concepts have been disclosed in conjunction with some embodiments as described above. Those skilled in the art will appreciate that various modifications, additions, and substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:

1. A lock detecting circuit comprising:
   a pre-clock detection signal generating circuit configured to detect phases of a first clock and a second clock and generate a first pre-clock detection signal and a second pre-clock detection signal based on the detected phases;
   a first clock detection signal generating circuit configured to generate a first clock detection signal by adjusting a pulse width of the first pre-clock detection signal;
   a second clock detection signal generating circuit configured to generate a second clock detection signal by adjusting a pulse width of the second pre-clock detection signal;
   a lock control circuit configured to detect a phase difference between the first clock and the second clock based on the first clock detection signal and the second clock detection signal to generate a lock signal; and
   a division control circuit configured to generate a division reset signal and a selection signal for controlling toggling of division clocks, based on the first clock detection signal, the second clock detection signal, and a clock reset pulse.

2. The lock detecting circuit of claim 1, wherein the pre-clock detection signal generating circuit is configured to:
   detect a preset edge of the first clock to generate the first pre-clock detection signal that is activated, and
   detect a preset edge of the second clock to generate the second pre-clock detection signal that is activated.

3. The lock detecting circuit of claim 1, wherein the pre-clock detection signal generating circuit is further configured to generate a clock reset pulse at a time point when both a preset edge of the first clock and a preset edge of the second clock are detected and then a preset reset delay period has elapsed.

4. The lock detecting circuit of claim 1, wherein the first clock detection signal generating circuit is configured to:
   output the first pre-clock detection signal as the first clock detection signal when the pulse width of the first pre-clock detection signal is equal to or less than a set pulse width, and
   adjust the pulse width of the first pre-clock detection signal to match the set pulse width and output, as the first clock detection signal, the first pre-clock detection signal with the adjusted pulse width, when the pulse width of the first pre-clock detection signal is greater than the set pulse width.

5. The lock detecting circuit of claim 1, wherein the second clock detection signal generating circuit is configured to:
   output the second pre-clock detection signal as the second clock detection signal when the pulse width of the second pre-clock detection signal is equal to or less than a set pulse width, and
   adjust the pulse width of the second pre-clock detection signal to the set pulse width and output, as the second clock detection signal, the second pre-clock detection signal with the adjusted pulse width, when the pulse width of the second pre-clock detection signal is greater than the set pulse width.

6. The lock detecting circuit of claim 1, wherein the division control circuit is configured to generate the division reset signal that is activated to initialize the division clocks in an initialization operation.

7. The lock detecting circuit of claim 1, wherein the division control circuit is configured to generate a latch clock detection signal that is activated to initiate a lock detection period when a phase difference between the first clock and the second clock is equal to or less than a set phase difference.

8. The lock detecting circuit of claim 7, wherein the division control circuit is configured to activate the selection signal to toggle the division clocks when the lock detection period is initiated.

9. The lock detecting circuit of claim 1, wherein the lock control circuit is configured to generate a judgement clock based on a division clock, which is selected from the division clocks according to a judgement code, the division clocks being generated based on the division reset signal and the selection signal, and to generate the lock signal based on the judgement clock.

10. The lock detecting circuit of claim 9, wherein the lock control circuit is configured to generate the judgement clock that is activated based on the division clock selected according to the judgement code and to generate the lock signal that is activated based on the judgement clock, when a lock detection period is initiated.

11. The lock detecting circuit of claim 10,
    wherein the lock control circuit includes a plurality of judgement clock selectors, and
    wherein each of the judgement clock selectors selects and outputs one of the division clocks, based on the judgement code.

12. The lock detecting circuit of claim 9, further comprising a division clock generating circuit configured to toggle the division clocks when the division reset signal is deactivated and the selection signal is activated.

13. A lock detecting circuit comprising:
    a division control circuit configured to generate a latch clock detecting signal that is activated to initiate a lock detection period when a phase difference between a first clock and a second clock is equal to or less than a set phase difference, and to activate a selection signal to toggle division clocks when the lock detection period is initiated; and a lock control circuit configured to generate a judgement clock that is activated based on a division clock selected from the division clocks according to a judgement code and to generate a lock signal that is activated when the judgement clock is activated, after the lock detection period is initiated.

14. The lock detecting circuit of claim 13, wherein the division control circuit is configured to generate a division reset signal that is activated to initialize the division clocks in an initialization operation.

15. The lock detecting circuit of claim 14, further comprising a pre-clock detection signal generating circuit configured to detect a preset edge of the first clock to generate a first pre-clock detection signal, to detect a preset edge of the second clock to generate a second pre-clock detection signal, and to generate a clock reset pulse based on the first pre-clock detection signal and the second pre-clock detection signal.

16. The lock detecting circuit of claim 15, further comprising:

a first clock detection signal generating circuit configured to adjust a pulse width of the first pre-clock detection signal to generate the first clock detection signal; and a second clock detection signal generating circuit configured to adjust a pulse width of the second pre-clock detection signal to generate the second clock detection signal.

17. An electronic device comprising:

a lock detecting circuit configured to generate a first pre-clock detection signal and a second pre-clock detection signal by detecting phases of a first clock and a second clock, adjust pulse widths of the first pre-clock detection signal and the second pre-clock detection signal to generate a first clock detection signal and a second clock detection signal, and detect a phase difference between the first clock and the second clock based on the first clock detection signal and the second clock detection signal to generate a lock signal; and a division control circuit configured to generate a division reset signal and a selection signal for controlling toggling of division clocks, based on the first clock detection signal, the second clock detection signal, and a clock reset pulse.

18. The electronic device of claim 17, wherein the division control circuit is configured to:

generate a latch clock detection signal that is activated to initiate a lock detection period when the phase difference between the first clock and the second clock is equal to or less than a set phase difference, and activate the selection signal to toggle the division clocks when the lock detection period is initiated.

* * * * *